July 30, 1946.   W. EHRLICH   2,404,776
COVER HOLDING BAND FOR PIES AND THE LIKE
Filed May 15, 1943   2 Sheets-Sheet 1
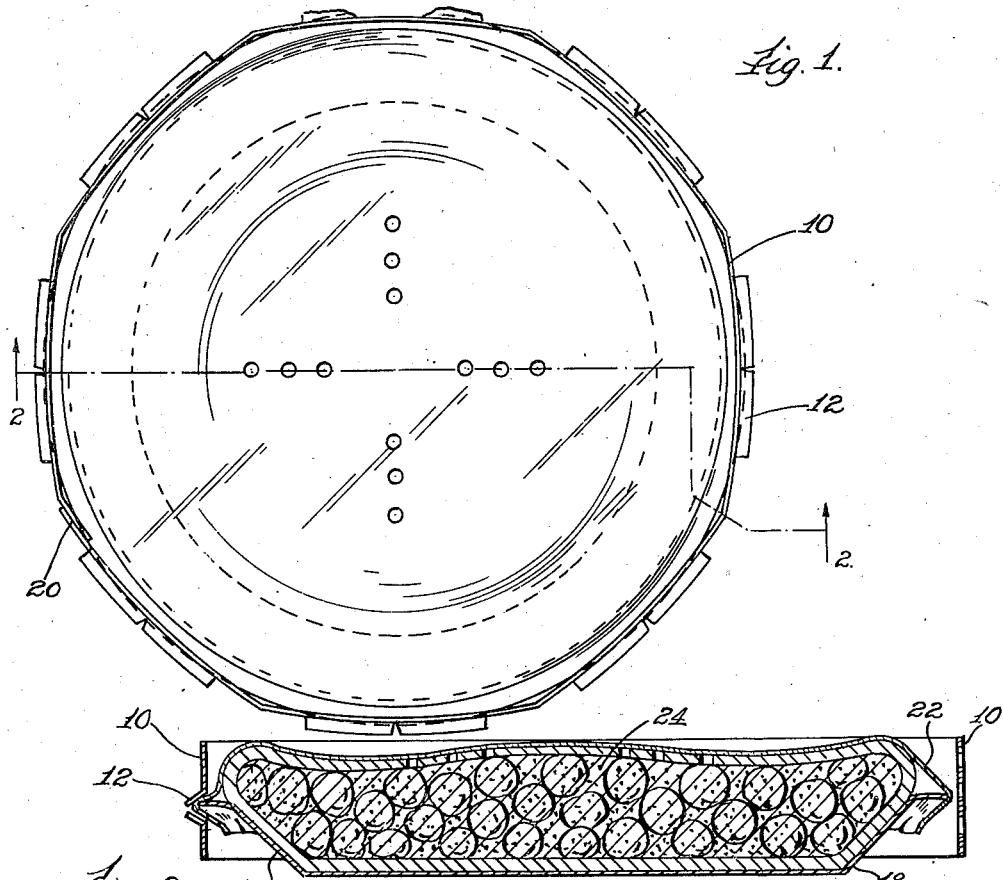
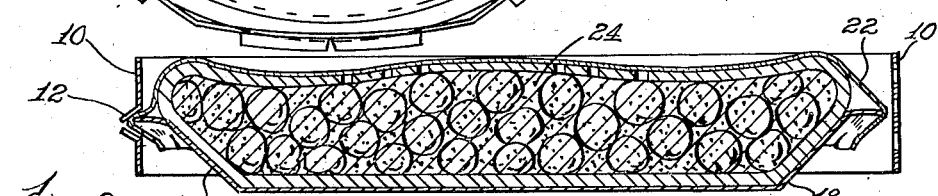
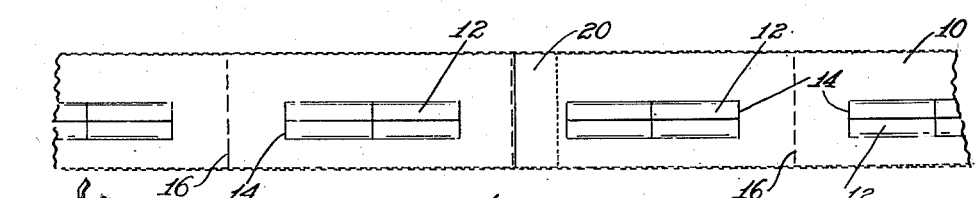
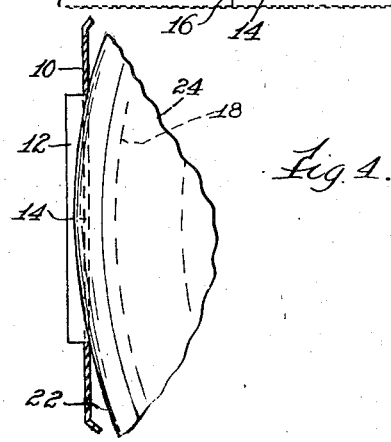
Inventor:
William Ehrlich
by Albert J. Fihe
his Attorney.

July 30, 1946.  W. EHRLICH  2,404,776
COVER HOLDING BAND FOR PIES AND THE LIKE
Filed May 15, 1943  2 Sheets-Sheet 2
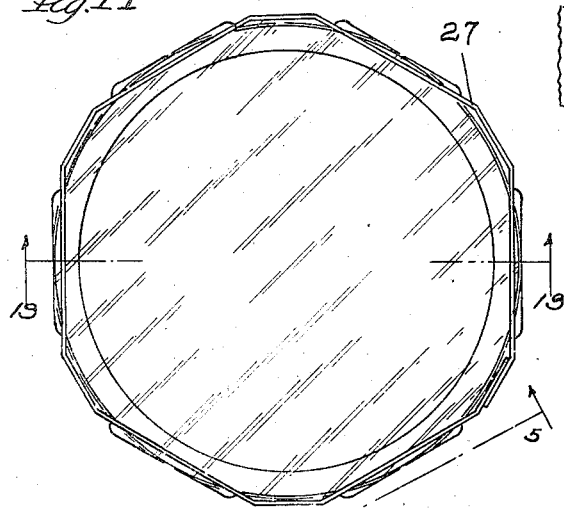
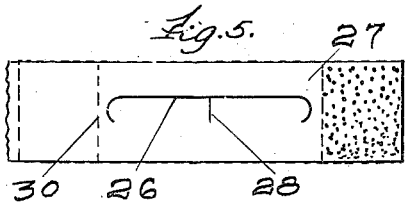
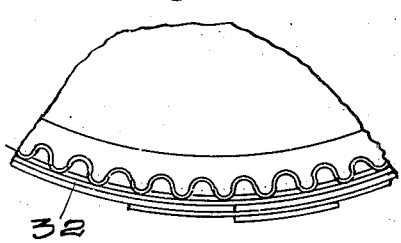
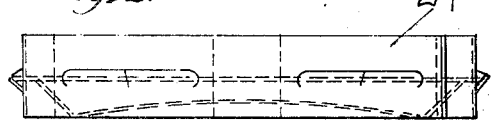
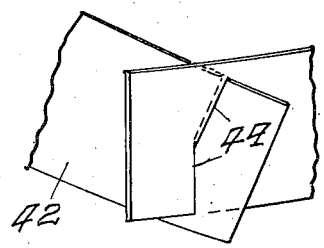
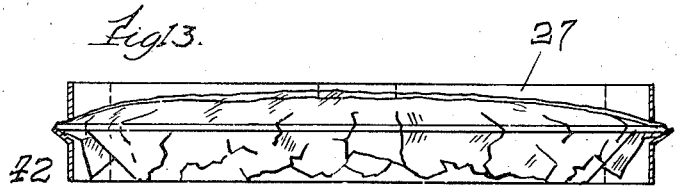
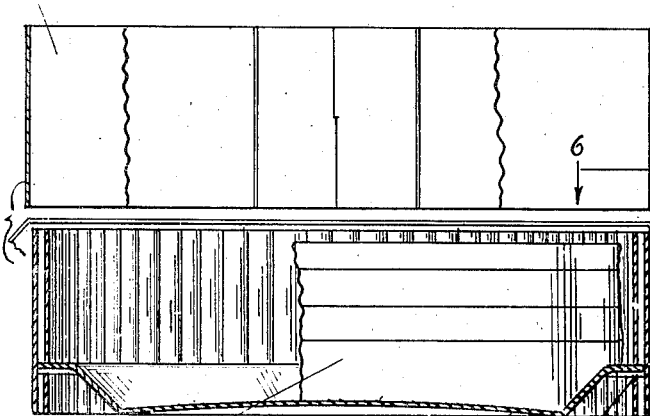
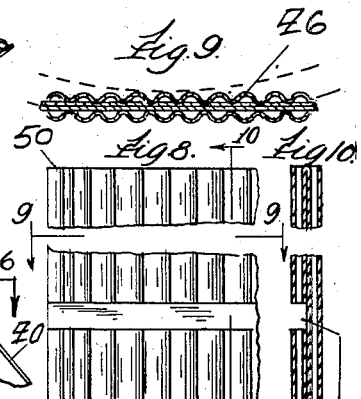
Inventor:
William Ehrlich
by Albert G. Fihe
Attorneys.

Patented July 30, 1946

2,404,776

UNITED STATES PATENT OFFICE 2,404,776

COVER HOLDING BAND FOR PIES AND THE LIKE

William Ehrlich, Fox River, Wis.

Application May 15, 1943, Serial No. 487,405

1 Claim. (Cl. 206—44)

This invention relates to an improved cover holding band for pies and the like and relates to improvements over and above my prior patents on similar devices numbered 2,068,540 dated January 19, 1937, and 2,133,607 dated October 18, 1938. The invention also relates to improvements over my application for patent entitled "Perforated pie band" which was filed in the United States Patent Office on August 16, 1941, Serial Number 407,163.

One of the important objects of the invention is the provision of means for retaining a transparent covering over a pie or cake when the pie or cake is in position on a paper plate or the like.

Another important object of the invention is the provision of means for providing a substantial container for packaged pie so that the same can be handled and shipped with considerable ease and with far less danger of breakage or damage than when not incased in the packaging band of this invention.

Another specific object of my invention is to provide a band for pie packages or the like which shall be very economically and simply manufactured and which also will be easily applied while, at the same time, adequately maintaining itself in position after application.

Other and further important objects of the invention will be apparent from the disclosures in the accompanying drawings and following specification.

The invention, in a preferred form, is shown in the drawings and hereinafter more fully described.

In the drawings:

Figure 1 is a top plan view of a pie positioned on a plate covered with a transparent sheet and inclosed in this assemblage by means of the improved slitted pie band of my invention.

Figure 2 is a sectional view taken on the line 2—2 of Figure 1, showing details of the assembled construction.

Figure 3 is a plan view of the improved slitted pie band of my invention, showing the same in strip form and portions broken away.

Figure 4 is an enlarged detail view showing more completely the gripping action of my slitted band on the transparent sheet covering for a pie plate applied in accordance with my invention.

Figure 5 is a side elevation of a part of a pie band similar to that shown in Figure 3 but illustrating a slight modification.

Figure 6 shows another modification of the invention, wherein the band is made of corrugated paper as distinguished from a flat strip.

Figure 7 is a detail view showing the joined ends of a collar element which is used for holding the band of Figure 6 in desired position.

Figure 8 is a side elevation showing a further modified form of the invention illustrated in Figure 6, namely, the use of a corrugated band, which in this case is double, as distinguished from the single layer shown in Figure 6.

Figure 9 is a sectional view taken on the line 9—9 of Figure 8, looking in the direction indicated.

Figure 10 is a vertical sectional view taken on the line 10—10 of Figure 8.

Figure 11 is a top plan view of a pie plate having a sheet of covering material held in place thereon by means of the band of Figure 5.

Figure 12 is a side elevation of the structure of Figure 11.

Figure 13 is a sectional view taken on the line 19—19 of Figure 11.

Figure 14 is an exploded view showing the band of Figure 6 applied to a pie plate, and wherein a cream pie or a pie having a greater height than the ordinary pie, is packaged. The upper portion of this figure shows the encircling band of Figure 7 about to be applied to the partially completed package.

As shown in the drawings:

The reference numeral 10 indicates generally the improved slitted pie band of my invention, and this consists essentially of a strip of cardboard or the like of suitable strength and resiliency.

The strip of cardboard is provided with sets of series of longitudinal and transverse slits as indicated at 12 and 14 in Figure 3. These slits are formed in the band during the process of manufacture, and are so made that no material of the band itself will be cut away, but the slits extend completely through the material of the band, there being in each case one long longitudinal slit 12 and three transverse slits 14, two of the transverse slits being at the ends of the longitudinal slit and another transverse slit being adjacent the middle of the longitudinal slit 12.

The strip of cardboard 10 is also scored or perforated at regular intervals as illustrated at 16, so that it can be more conveniently and readily formed into hexagonal or octagonal shape as illustrated in Figure 1 to fit about a pie plate 18. The ends of the band are joined together at 20 in order to form a substantially circular loop, as is usual in all these pie band constructions. These circular loops can be of different sizes so as to completely encircle pie plates of different sizes. The pie is preliminarily covered with a sheet 22 of regenerated cellulose or some similar material, either transparent or otherwise.

The band 10 of this invention is then applied to the assembled plate 18, contained pie 24, and covering sheet 22, by pushing the band downwardly about the edges of the pie plate 18, whereupon the band will flex at the points indicated by the transverse scores 16, assuming a hexagonal, octagonal or other shape, depending upon the number of such series of scores 16.

When the edge of the pie plate 18 comes into alignment with the series of longitudinal slits 12, portions of the band adjacent these slits will be pushed outwardly, as best shown in Figure 2, and the edge of the pie plate will project through the resultant opening while, at the same time, the cover 22, which has been preliminarily passed down and around the edges of the pie plate 18, will be gripped in locked position about the edges of the pie plate, as best shown in Figure 2 and in Figure 4.

This gripping action will satisfactorily lock and retain the cover sheet 22 in desired position above the pie or cake and around the edges of the containing or supporting plate, and the gripping action is considerably superior to the action of the slots shown in my prior Patent No. 2,133,607, and the band itself is more economical to manufacture than the band disclosed in my prior Patent No. 2,068,540. With regard to my Patent No. 2,316,574, it has been found that the slitted band of this invention is more readily and economically manufactured, as there is no waste of any kind, and the gripping and retaining action is, if anything, somewhat superior. Such advantages will be immediately apparent to anyone skilled in this art.

In Figure 5, another type of band is shown, which has also been found quite satisfactory, and this is along the same lines as the band 10 previously described. However, this band has only one longitudinal slit, as shown at 26, the ends being curved downwardly, as illustrated, and a central vertical cut 28 is provided, this being similar to the central vertical cut 14 of the band previously described. Perforations 30 are provided so that the band may be readily bent into desired shape to fit about a pie plate, as is best illustrated in Figure 11. It will be noted that the band shown in Figure 5 will open at the top only, as distinguished from a middle opening in the band of Figure 3. The sheet of transparent or other covering material which is placed over the pie is very adequately gripped by the slitted band of Figure 5, and a very satisfactory construction results, both from the standpoint of assembly and use.

In Figures 12 and 13, the action of this band 27 as applied to a pie and a cover therefor is clearly illustrated.

In Figures 6 and 14, the band is shown as composed of a strip of corrugated paper 32, the corrugations being cut away, as best shown at 34 in Figure 14, so as to provide an annular slot or recess into which the edge of the pie plate 36 is snapped or otherwise fitted. This embodiment is used for tall pies or even cakes, such as shown at 38, and a sheet of some covering material 40 is applied to the top of the band 32 after it has been applied to a pie plate and its contents. This is held in place by a collar or the like 42, which is of a size to fit tightly about the annular band 32, and this collar comprises merely a strip of paper joined at its ends in some manner, preferably by way of two opposed slits 44, as illustrated in Figure 7.

In Figures 8, 9 and 10, a further modified form of band is shown, as comprising a double corrugated element 46, being scored at 48 and 50 so that the ends may be doubled inwardly over each other, as illustrated in Figure 10. These ends are of such width that when the device is doubled upon itself, a slot 52 results, into which the edge of the pie plate is inserted during the assembly operation.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A cover-holding band for pies and the like comprising a strip of material having its ends joined, a series of longitudinal slits in the strip adjacent the middle line thereof and at regular intervals therearound, and a shorter transverse slit adjacent each longitudinal slit, and connecting into the middle portion thereof, the longitudinal slit having its ends turned downwardly and inwardly, the associated slits, when opened, being for the gripping reception of parts of the periphery of a pie-supporting plate and a co-operating cover therefor, the band adapted for encircling the periphery of such pie plate and associated cover, with portions of the pie plate and cover projecting through the opened slits.

WILLIAM EHRLICH.